US005677792A

United States Patent [19]

Hamano

[11] Patent Number: 5,677,792

[45] Date of Patent: Oct. 14, 1997

[54] ZOOMING OPTICAL SYSTEM

[75] Inventor: Hiroyuki Hamano, Yamato, Japan

[73] Assignee: Canon Kabushiki Kaisha, Tokyo, Japan

[21] Appl. No.: 317,537

[22] Filed: Oct. 4, 1994

[30] Foreign Application Priority Data

Oct. 8, 1993 [JP] Japan .................................... 5-253051

[51] Int. Cl.$^6$ ............................ G02B 27/64; G02B 15/14

[52] U.S. Cl. ............................................ 359/557; 359/683

[58] Field of Search ...................................... 359/557, 683

[56] References Cited

U.S. PATENT DOCUMENTS

| | | | |
|---|---|---|---|
| 2,959,088 | 11/1960 | Räntsch | 356/250 |
| 5,040,881 | 8/1991 | Tsuji | 359/557 |
| 5,182,671 | 1/1993 | Kitagishi et al. | 359/557 |
| 5,315,435 | 5/1994 | Horiuchi | 359/557 |

FOREIGN PATENT DOCUMENTS

| | | |
|---|---|---|
| 56-21133 | 5/1981 | Japan . |
| 61-223819 | 10/1986 | Japan . |

*Primary Examiner*—Georgia Y. Epps
*Assistant Examiner*—Jordan M. Schwartz
*Attorney, Agent, or Firm*—Fitzpatrick, Cella, Harper & Scinto

[57] ABSTRACT

A zooming optical system provided with a variable angle prism member of which the vertical angle is variable, and designed such that the vertical angle of the prism member is varied by a drive force applied from outside to thereby deflect a beam of light, wherein provision is made of a first lens unit having positive refractive power and a plurality of lens units including a movable lens unit rearwardly of the first lens unit, the first lens unit is divided into a front lens unit of negative refractive power and a rear lens unit of positive refractive power, and the prism member is disposed between the front lens unit and the rear lens unit.

11 Claims, 12 Drawing Sheets w = 30.9°
-0.01
0.01
POWER
CHROMATIC
ABERRATION
( g LINE )

w = 30.9°
-5.00 DISTORTION [%] 5.00 w = 30.9°
ΔS
ΔM
-0.05 ASTIGMATISM 0.05 fno/1.65
d
g
-0.05
0.05
SPHERICAL
ABERRATION

ZOOMING OPTICAL SYSTEM

BACKGROUND OF THE INVENTION

1. Field of the Invention

This invention relates to a zooming optical system (variable power optical system) containing a light deflecting member therein, and is particularly suitable for the so-called optical vibration preventing system of a video camera, a photographic camera, an observation mirror or the like which uses a variable angle prism as a light deflecting member and compensates for the movement of an image even when a vibration is applied to the optical system.

2. Related Background Art

When an attempt is made to take a photograph from a moving object such as a running vehicle or a flying aircraft, vibrations are transmitted to a phototaking system to thereby cause blurring to the photographed image.

There have heretofore been proposed various vibration preventing optical system having the function of preventing the blurring of a photographed image.

For example, in Japanese Patent Publication No. 56-21133, some optical members are moved in a direction to offset the vibrational displacement of an image caused by vibrations, in conformity with an output signal from detecting means for detecting the vibrated state of an optical apparatus, thereby achieving the stabilization of the image.

There has also been practiced a method of detecting the vibration of a photo-taking system by the utilization of an acceleration Kensor, and vibrating a lens group forming a part of the photo-taking system in a direction orthogonal to the optical axis thereof in conformity with a signal obtained at this time, thereby obtaining a static image.

Besides these, U.S. Pat. No. 2,959,088 proposes a vibration preventing optical system utilizing an inertial pendulum system wherein an afocal system comprising a first unit and a second unit of negative and positive refractive powers, respectively, which are equal in the absolute value of the focal length f is disposed forwardly of a photo-taking system and when the photo-taking system vibrates, the second unit is used as a movable lens unit for vibration prevention and is gimbal-supported at the focus position thereof.

In Japanese Laid-Open Patent Application No. 61-223819, there is described an example in which, in a photo-taking system wherein a variable angle prism is disposed most adjacent to the object side, the vertical angle of the variable angle prism is varied correspondingly to the vibration of the photo-taking system to thereby deflect an image and achieve the stabilization of the image.

However, disposing the variable angle prism most adjacent to the object side has given rise to a problem that an attempt to provide a wide angle to the optical system which is the main body results in the bulkiness of the prism. In contrast, there have been proposed several systems whereby a variable angle prism is disposed in a zoom lens, but as compared with a case where the prism is disposed adjacent to the object side, the correction angle necessary during vibration prevention is liable to become great, or the size of the optical system on the object side is liable to become larger than the prism for the purpose of securing a quantity of light during vibration prevention.

Also, when a variable angle prism is disposed in a variable power portion or more adjacent to the image plane side than to the variable power portion, the relation between the angle of inclination of the photo-taking system and the amount of variation in the vertical angle of the prism necessary to correct it is changed by focal-length change and therefore, the information of the focal length becomes necessary during correction.

SUMMARY OF THE INVENTION

The present invention has as its first object the provision of a zooming optical system in which the optical system is not made so large as compared with a case where a variable angle prism is not contained in the optical system.

The present invention has as its second object the provision of a zooming optical system which need not use the information of the focal length.

According to a preferred embodiment of the present invention, in an optical system which is provided with a variable angle prism member of which the vertical angle is variable and which is designed such that the vertical angle of said prism member is varied by a drive force imparted from outside to thereby deflect a beam of light, there are provided a first lens unit having positive refractive power and a plurality of lens units including a movable lens unit disposed rearwardly of the first lens unit, said first lens unit being divided into a front lens unit and a rear lens unit, said prism member being disposed between said front lens unit and said rear lens unit. In this case, it is desirable that the refractive power of the front lens unit be negative and the refractive power of the rear lens unit be positive. An example of the variable angle prism is known and therefore, detailed description thereof is omitted, but there is one in which two transparent rigid members are connected together by bellows to provide a water-tight space and this space is filled with liquid such as silicone oil, or one in which the space is filled with silicon rubber instead of liquid.

As an example of said plurality of lens units, there are a second lens unit of negative refractive power, a third lens unit of positive refractive power and a fourth lens unit of positive refractive power, or a second lens unit of negative refractive power, a third lens unit of negative refractive power, a fourth lens unit of positive refractive power and a fifth lens unit of positive refractive power.

By a variable angle prism being disposed in the first lens unit of the above-described zooming optical system, the downsizing of the system becomes possible and a wider angle can also be realized by a predetermined construction, and the system is made compact, and this is useful to improve the usability of the apparatus.

DETAILED DESCRIPTION OF THE PREFERRED EMBODIMENTS

Figure 1:
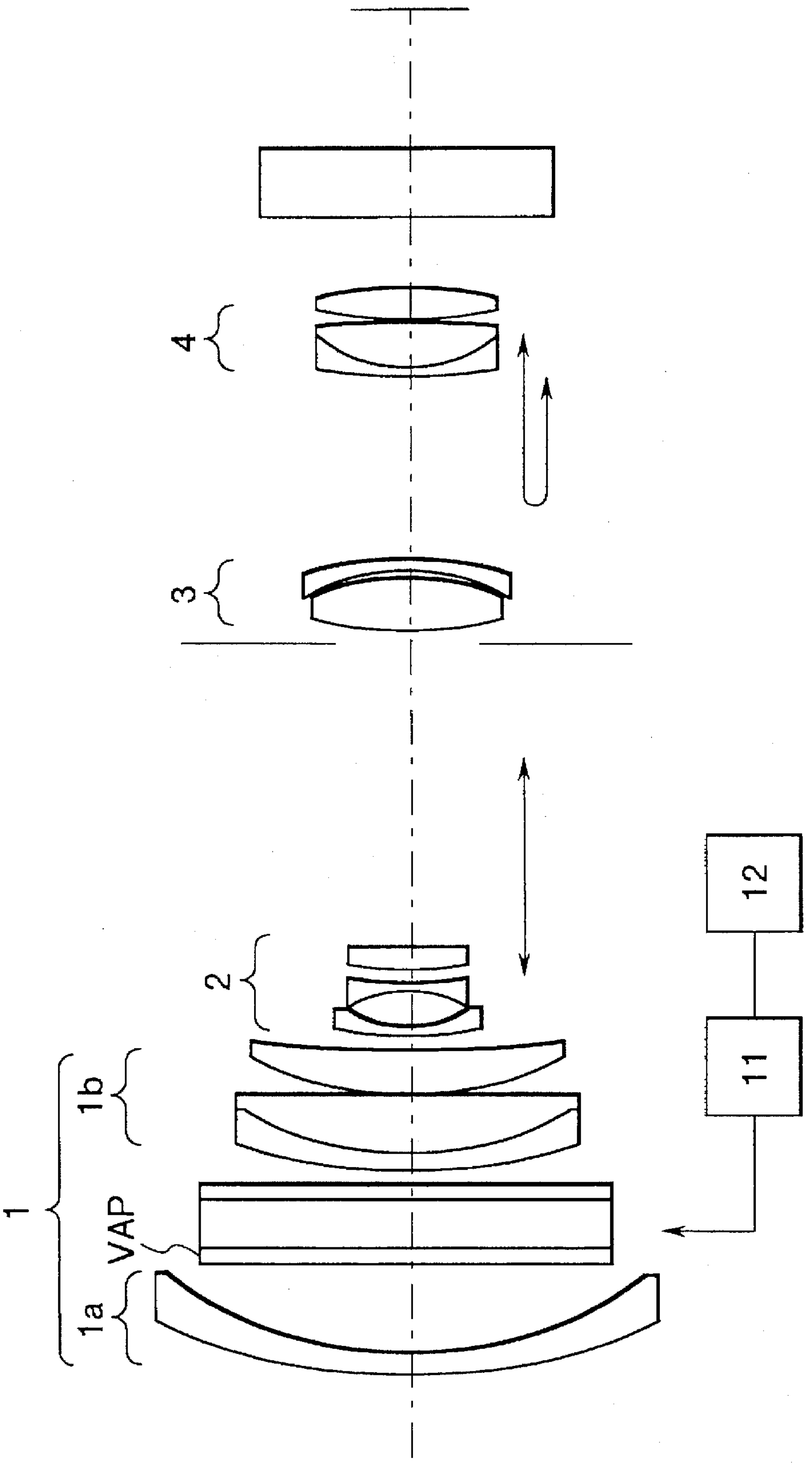
FIG. 1 is a cross-sectional view of a lens according to Embodiment 1.

FIG. 1 shows the cross-section of a lens according to Embodiment 1 of the present invention.

In FIG. 1, the reference numeral 1 designates a first lens unit having positive refractive power and adapted to be fixed during focal-length change and focusing, the reference numeral 2 denotes a second lens unit having negative refractive power and having the focal-length changing function, the reference numeral 3 designates a third lens unit having positive refractive power and adapted to be fixed during focal-length change and focusing, and the reference numeral 4 denotes a fourth lens unit having positive refractive power, effecting the correction of the movement of an image plane resulting from focal-length change and having the focusing function. Zooming is done by simultaneous movement of the second lens unit and the fourth lens unit.

The reference characters 1*a* and 1*b* designate a front lens unit of negative refractive power and a rear lens unit of positive refractive power, respectively, and a variable angle prism VAP is disposed in a space of fixed interval. In the present embodiment, the front lens unit 1*a* is particularly comprised of a negative single meniscus lens for the purpose of downsizing, but alternatively may be comprised of two negative single lenses or may be comprised of negative and positive lenses for the correction of chromatic aberration. In an actual photographing system, besides one to four optical systems, there are provided vibration detecting means 12 such as an acceleration sensor for finding the amount of vibration and prism driving means 11 for driving the variable angle prism, and the vertical angle of the variable angle prism is varied in conformity with the amount of vibration to thereby achieve stabilization of photographed images.

On the other hand, when the focal length of the first lens unit is f1 and the focal length of the whole system is $\tilde{f}$ and the magnification of the second and subsequent lens groups is β, $$\tilde{f}=f1\cdot\tilde{\beta} \tag{1}$$

and therefore, if f1 is shortened with the magnification of the second and subsequent lens units kept constant, the focal length of the whole system will become shorter, that is, a wider angle can be achieved.

However, shortening the focal length of the first lens unit with the object point of the second lens unit, i.e., the image point of the first lens unit, kept at a predetermined location would make the principal point interval between the first lens unit and the second lens unit smaller, and thus, at the wide angle end, the first lens unit and the second lens unit would mechanically interfere with each other.

In the present embodiment, the first lens unit 1 is comprised of the front lens unit 1*a* having negative refractive power and the rear lens unit 1*b* having positive refractive power, and the spacing therebetween is appropriately kept, whereby the rear principal point is moved rearwardly (toward the image point) to thereby shorten the focal length of the first lens unit and also secure a space between the first lens unit and the second lens unit. By the variable angle prism being disposed between the front lens unit 1*a* and the rear lens unit 1*b*, the whole system is made more compact than when the variable angle prism is simply disposed most adjacent to the object side, while a wider angle of the lens system is realized. The front lens unit 1*a* also has the function as a protective glass for preventing any force from being applied directly from outside to the variable angle prism.

Usually, when such a protective glass is constructed of a planar plate, rays of light will and return between the image pickup surface and the surface of the protective glass to cause a ghost.

In the present embodiment, this protective glass corresponds to a case where it has a suitable curvature, and therefore the intensity of such ghost can be made small.

Further, to achieve a wider angle with a splendid optical performance maintained, it is desirable that the following condition be satisfied:

$$3.0<|f1a/f1|<7.0 \tag{2}$$

where f1a and f1 are the focal lengths of the front lens unit 1*a* and the first lens unit, respectively. It is more preferable to set the upper limit value of this conditional expression to 6.0, or it will be more effective if the lower limit value of this conditional expression is set to 3.5. If the focal length of the front lens unit becomes short beyond the lower limit of conditional expression (2), it will be advantageous for a wider angle, but the correction of spherical aberration and coma at the telephoto end will become difficult and eccentric coma occurring during vibration prevention will become great, and this is not good.

If conversely, the focal length of the front lens unit becomes long beyond the upper limit of the conditional expression (2), a wider angle could not be sufficiently achieved.

In the present embodiment, the first lens unit is fixed during focal-length change or during focusing, but may be moved during focal-length change or focusing to such a degree as not to affect the control of the variable angle prism.

Figure 2:
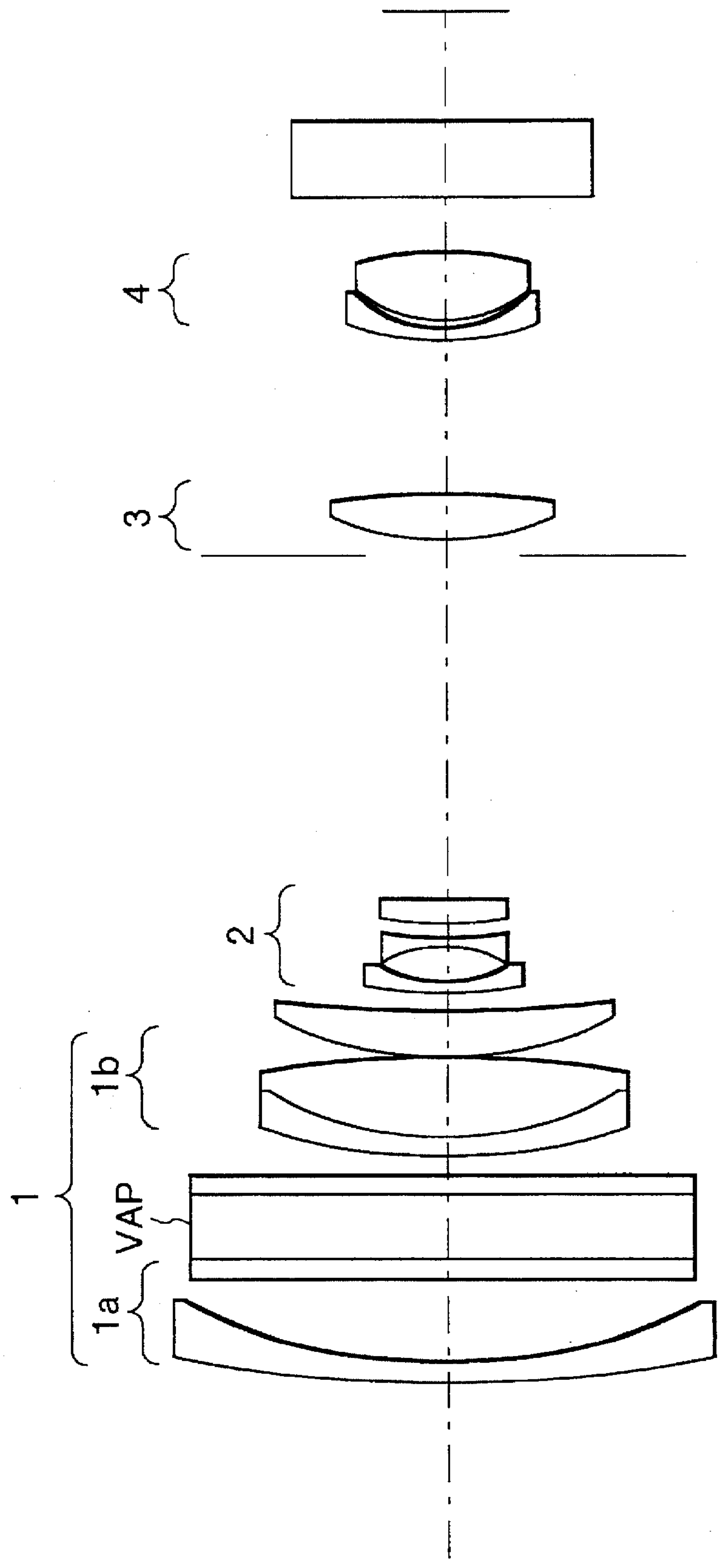
FIG. 2 is a cross-sectional view of a lens according to Embodiment 2.

The cross-sectional shape of the lens of FIG. 2 corresponds to numerical value Embodiment 2, and each lens shape differs from the lens system of FIG. 1, but the basic arrangement is the same as that of FIG. 1.

Figure 3:
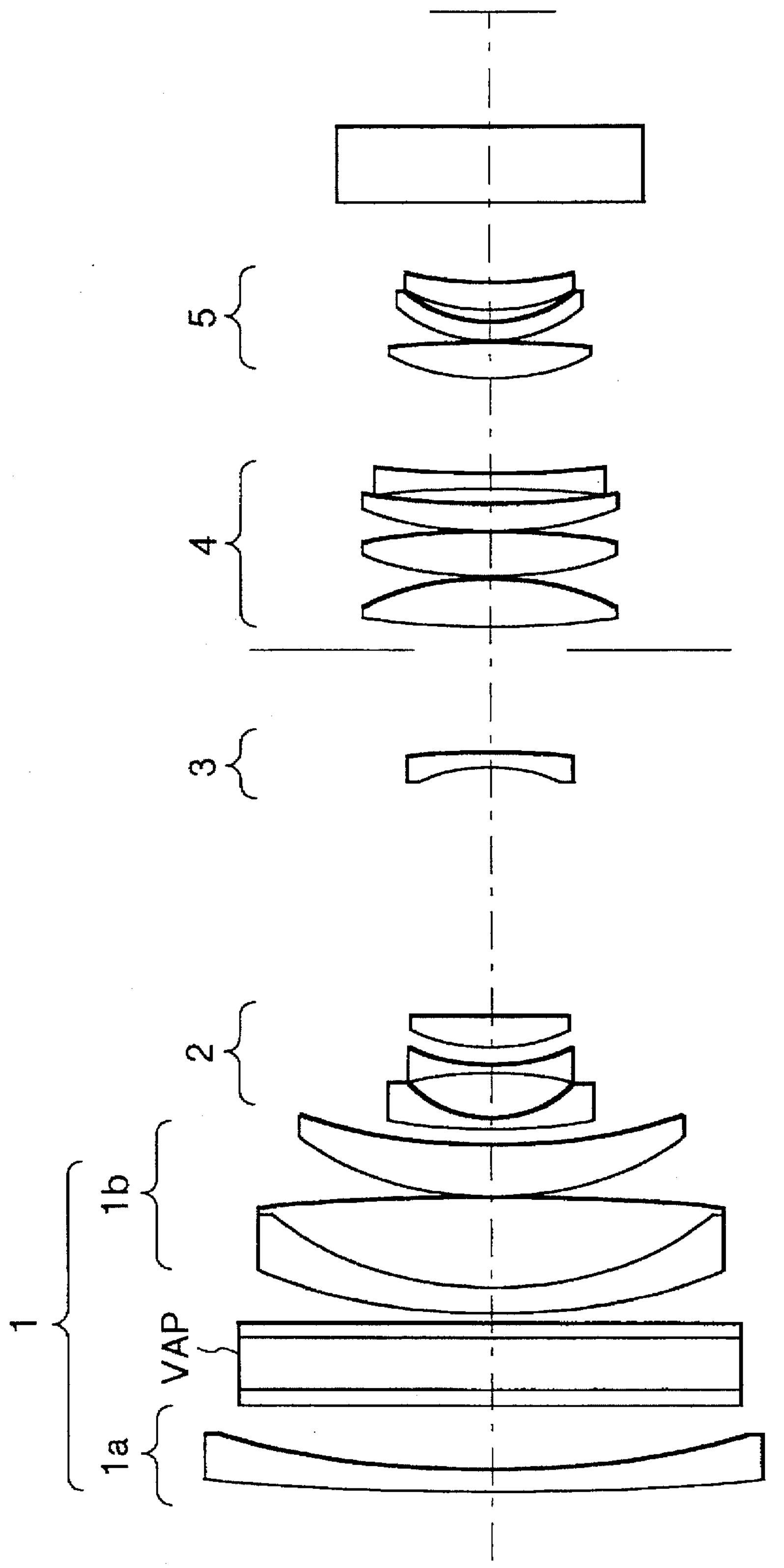
FIG. 3 is a cross-sectional view of a lens according to Embodiment 3.
Figure 4A:
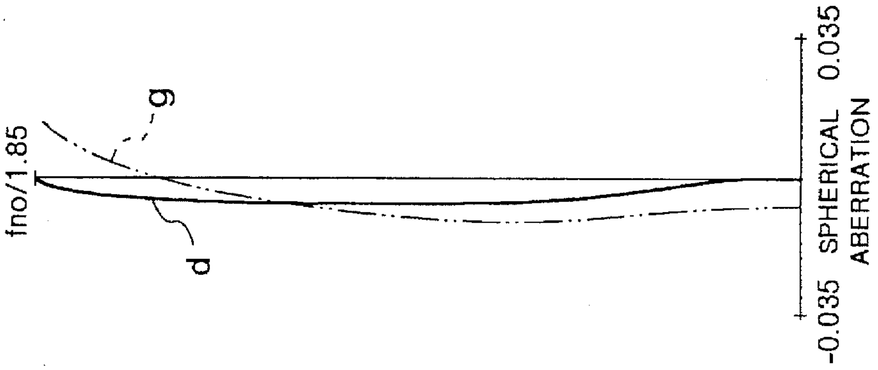
FIGS. 4A to 4D show aberrations at the wide angle end of Numerical Value Embodiment 1.
Figure 4B:
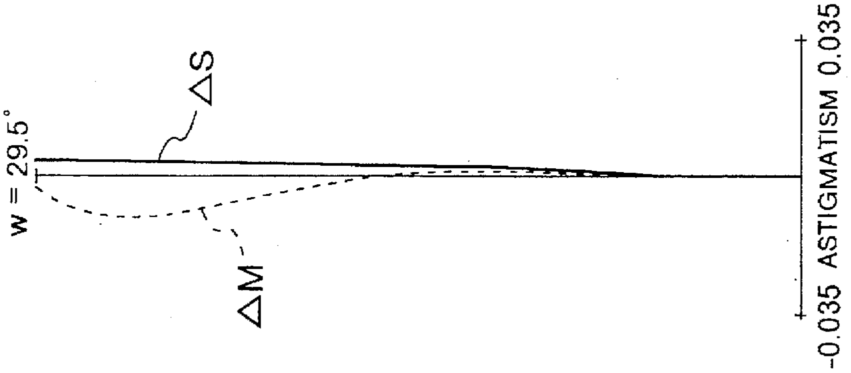
Figure 4C:
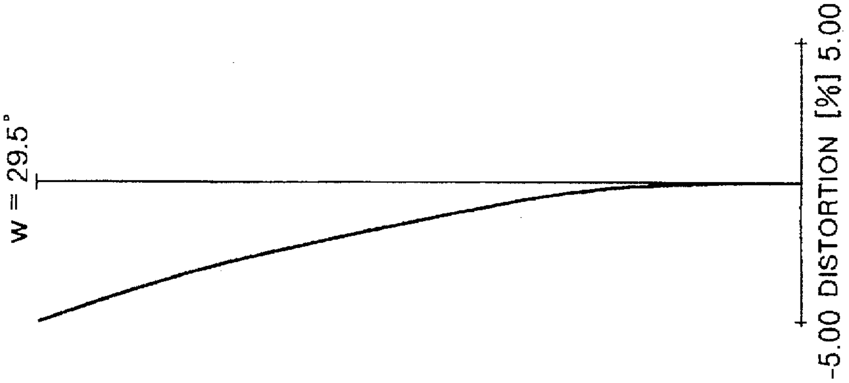
Figure 4D:
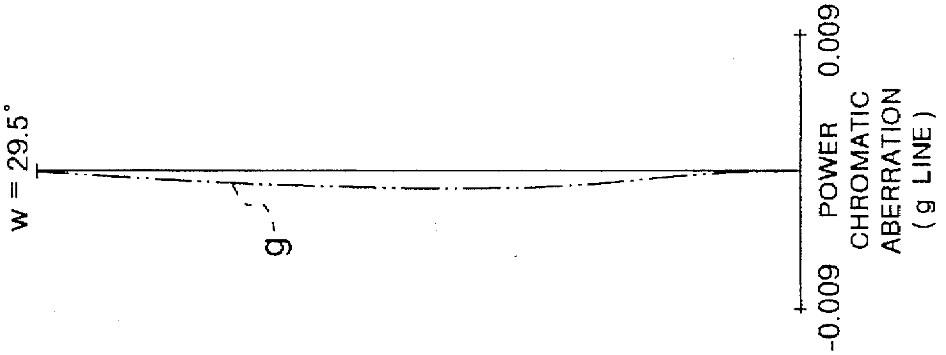
Figure 5D:
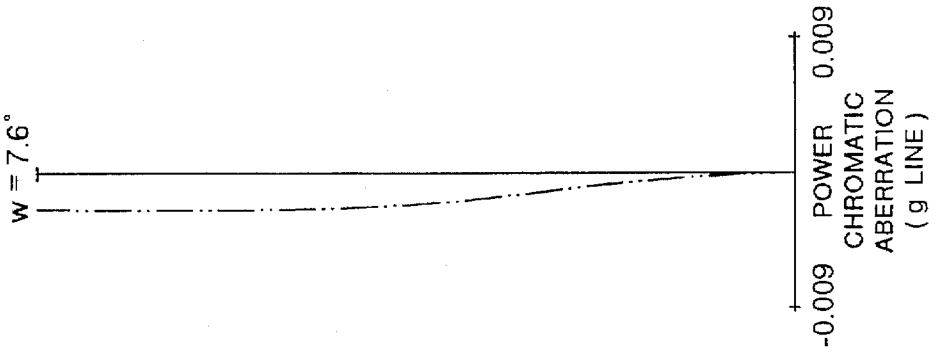
FIGS. 5A to 5D show aberrations at the medium angle of field of Numerical Value Embodiment 1.
Figure 5C:
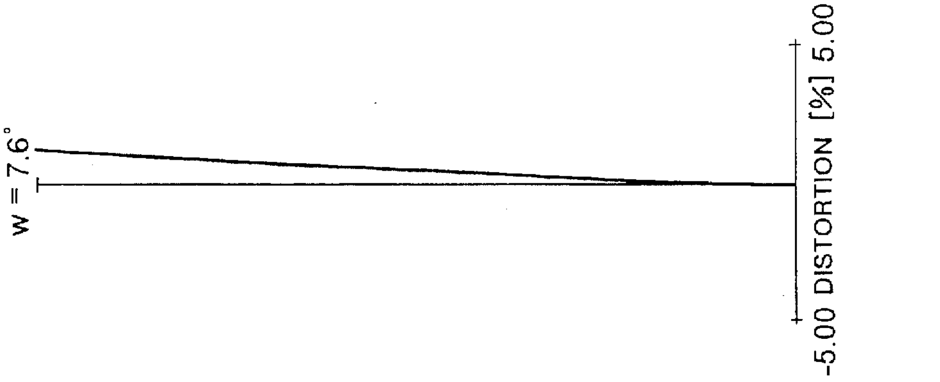
Figure 5B:
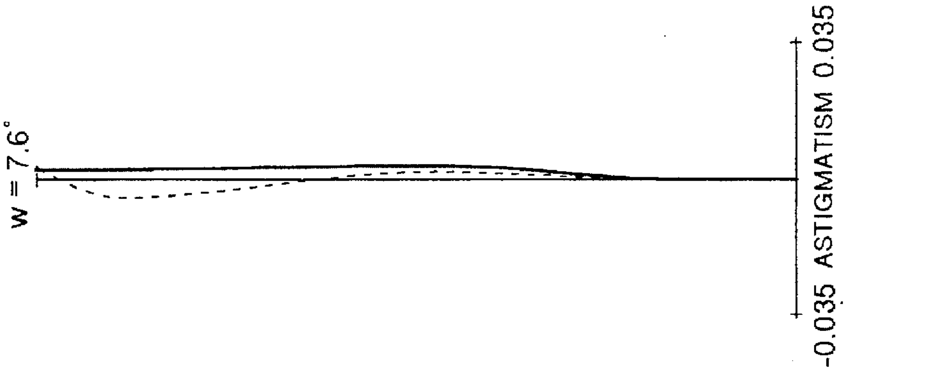
Figure 5A:
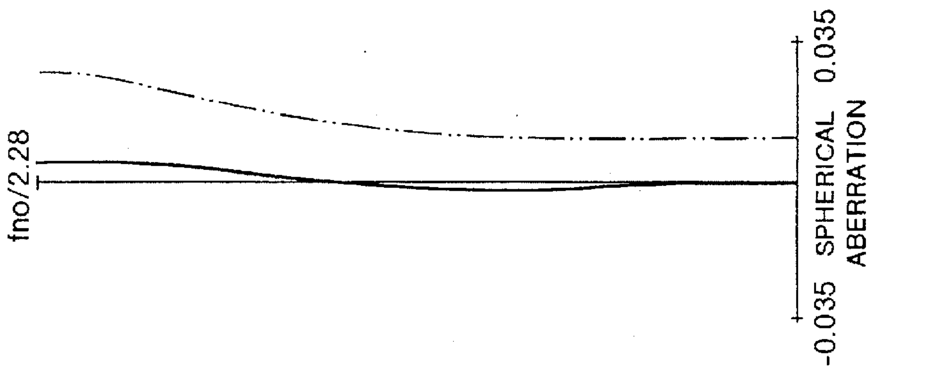
Figure 6A:
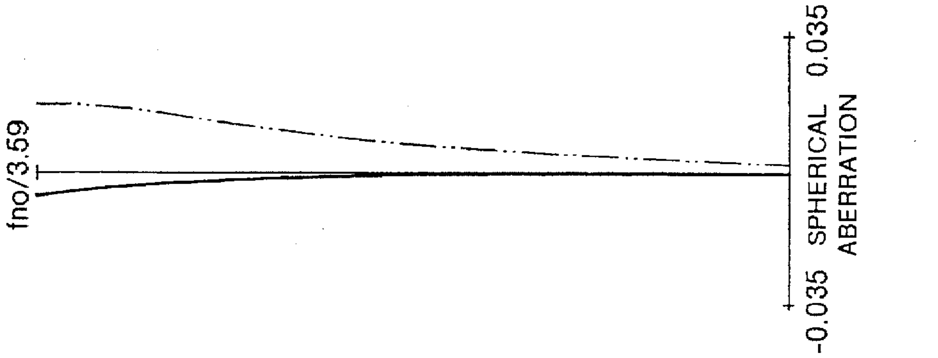
FIGS. 6A to 6D show aberrations at the telephoto end of Numerical Value Embodiment 1.
Figure 6B:
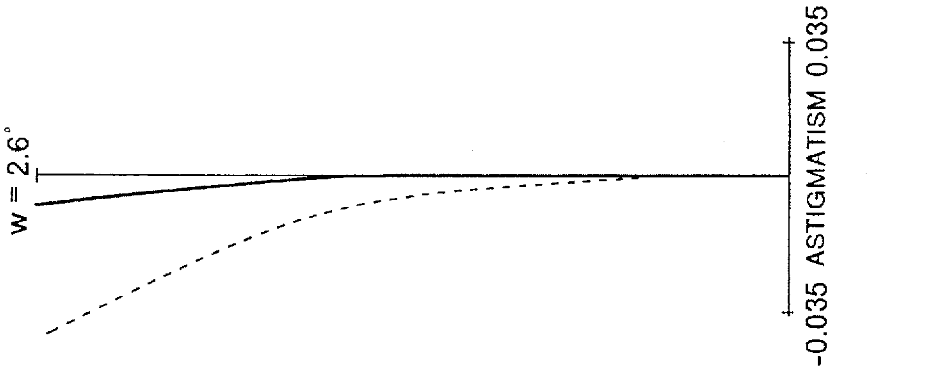
Figure 6C:
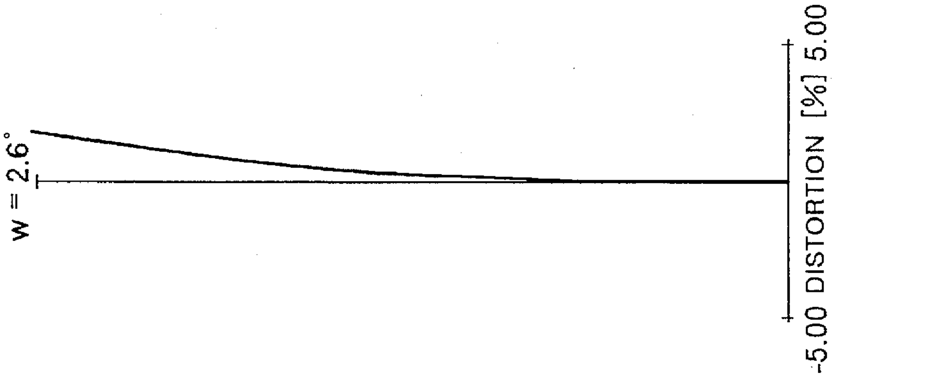
Figure 6D:
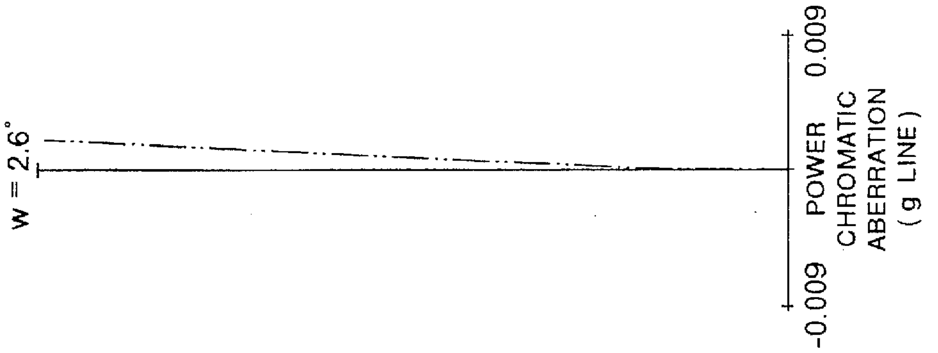
Figures 7A, 7B, 7C, 7D:
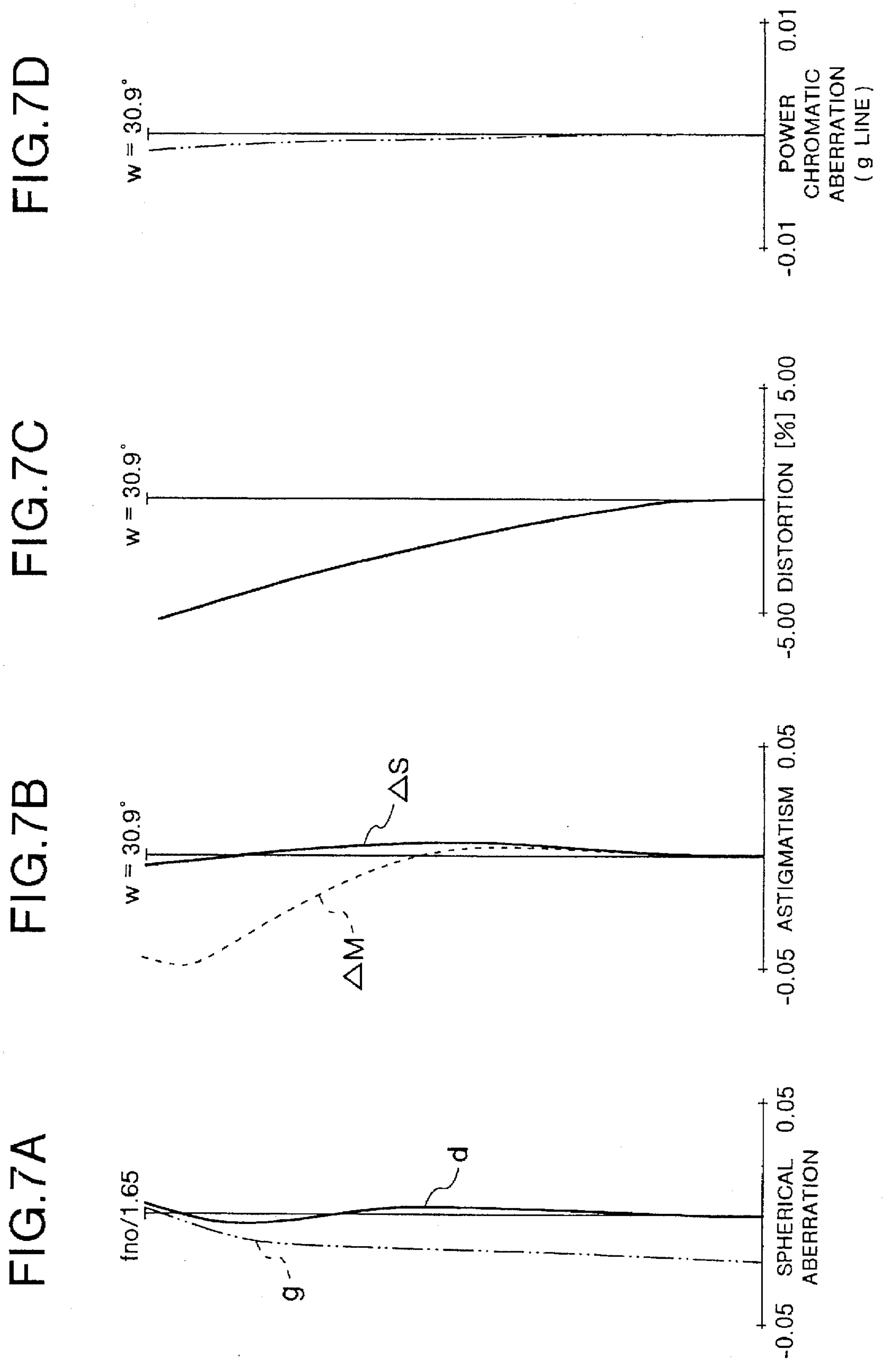
FIGS. 7A to 7D show aberrations at the wide angle end of Numerical Value Embodiment 2.
Figure 8D:
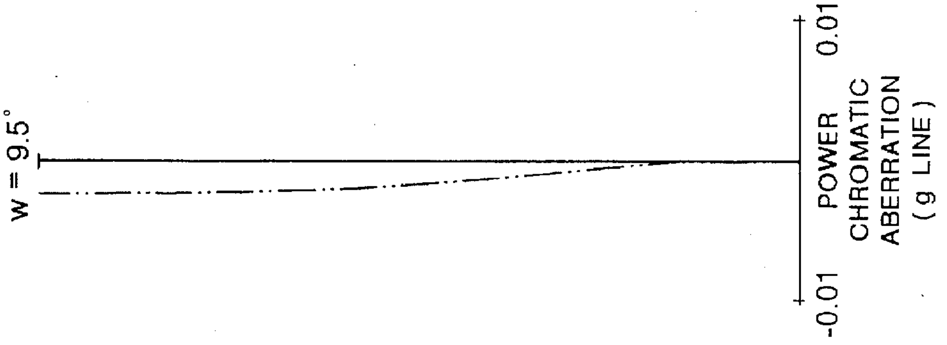
FIGS. 8A to 8D show aberrations at the medium angle of field of Numerical Value Embodiment 2.
Figure 8C:
Figure 8B:
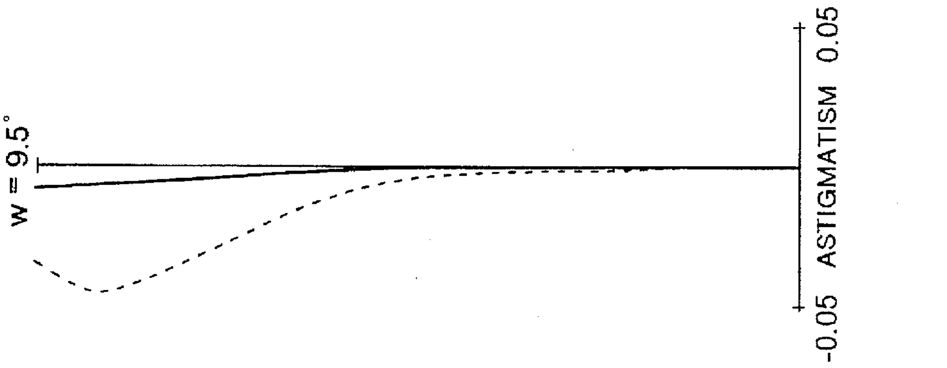
Figure 8A:
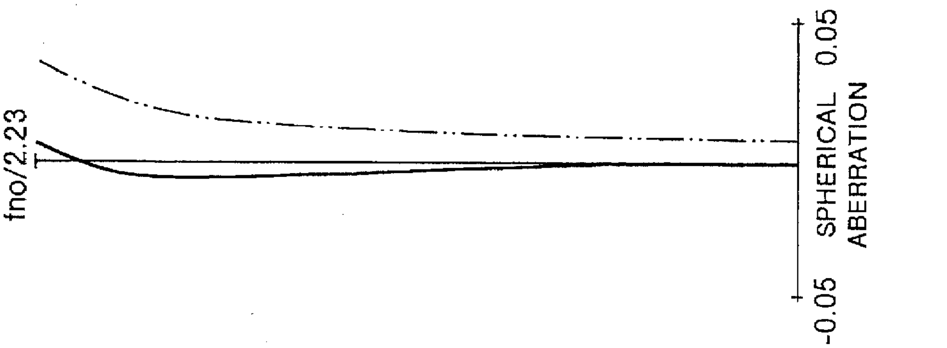
Figure 9A:
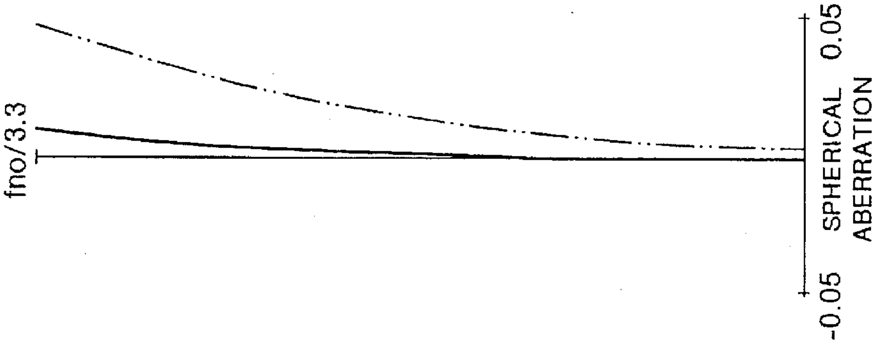
FIGS. 9A to 9D show aberrations at the telephoto end of Numerical Value Embodiment 2.
Figure 9B:
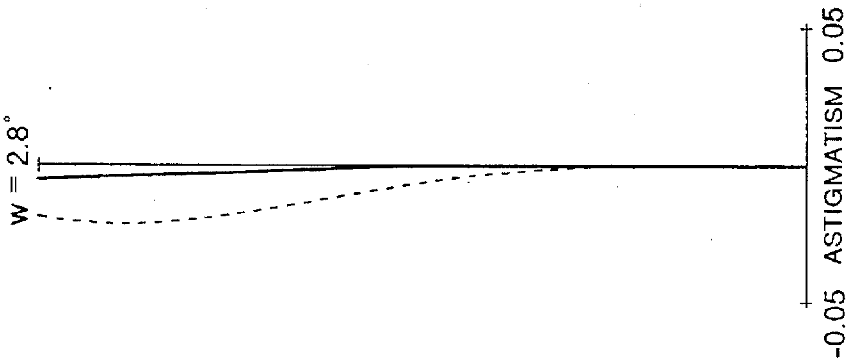
Figure 9C:
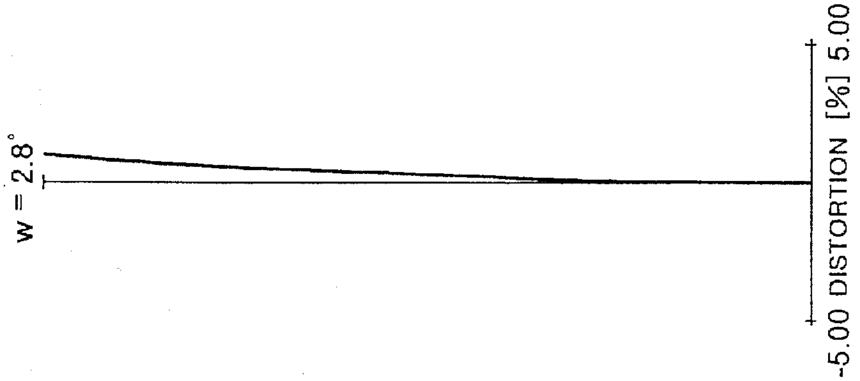
Figure 9D:
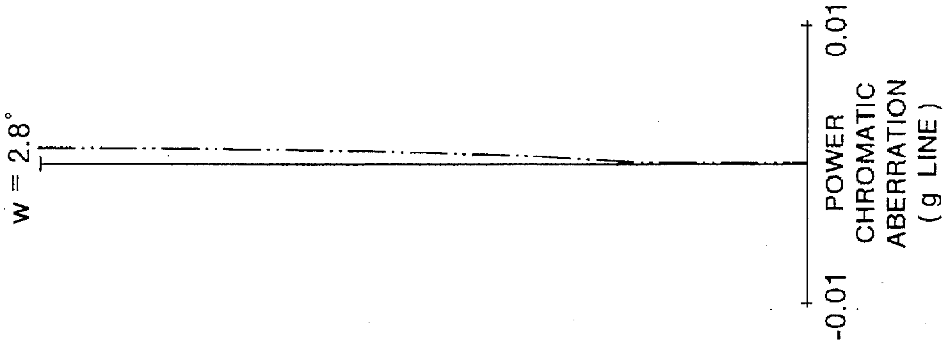
Figure 10D:
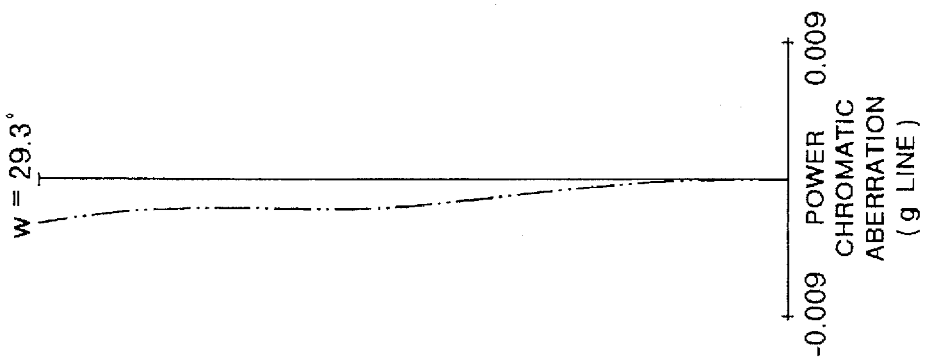
FIGS. 10A to 10D show aberrations at the wide angle end of Numerical Value Embodiment 3.
Figure 10C:
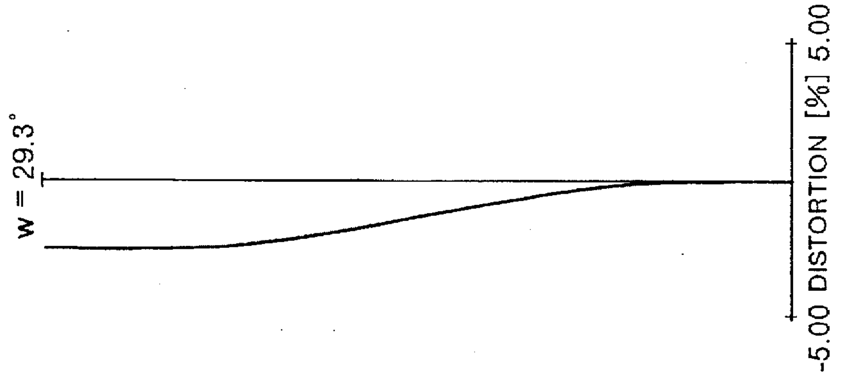
Figure 10B:
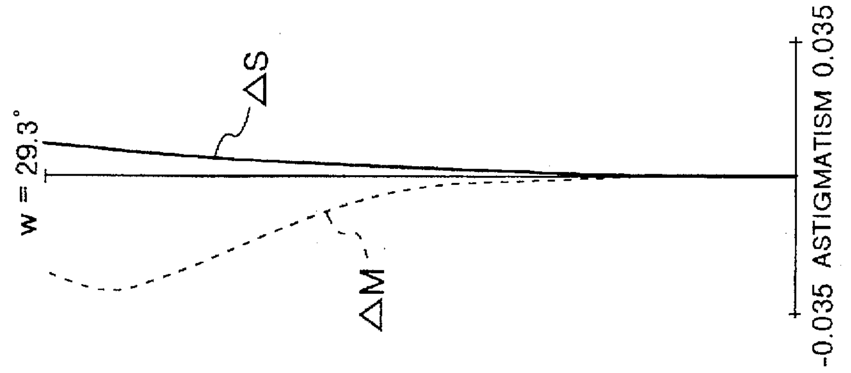
Figure 10A:
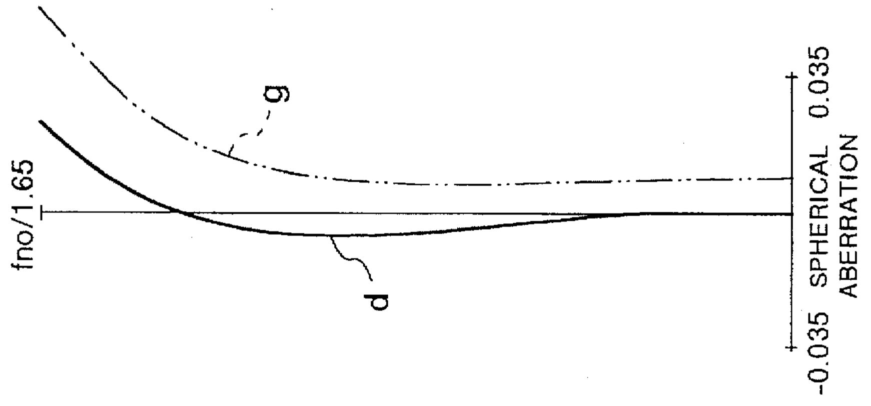
Figure 11A:
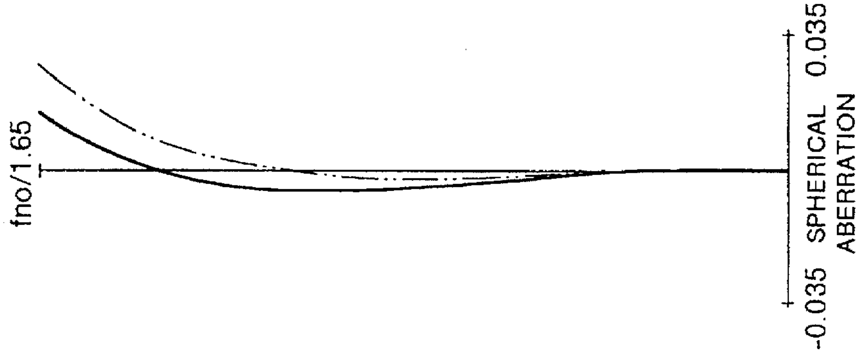
FIGS. 11A to 11D show aberrations at the medium angle of field of Numerical Value Embodiment 3.
Figure 11B:
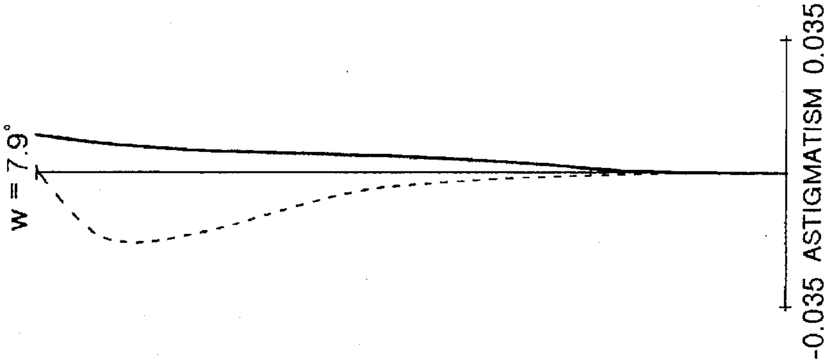
Figure 11C:
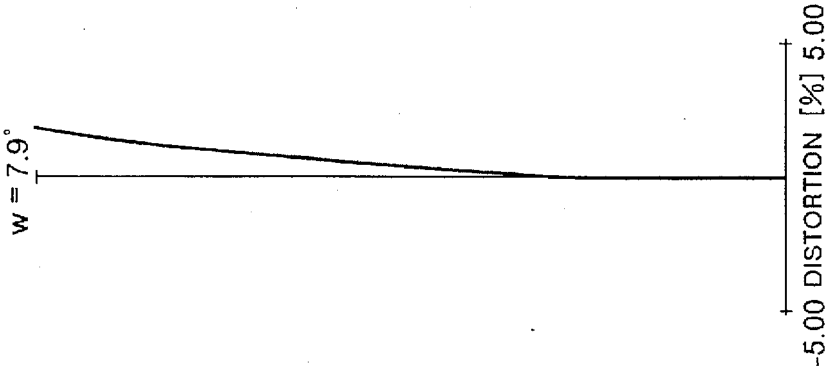
Figure 11D:
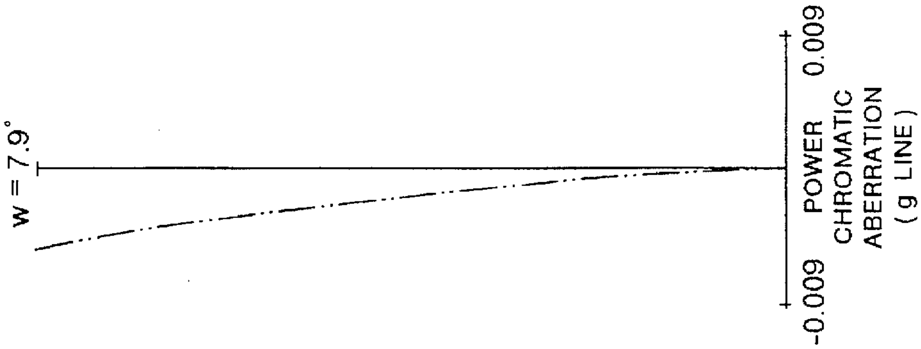
Figures 12A, 12B, 12C, 12D:
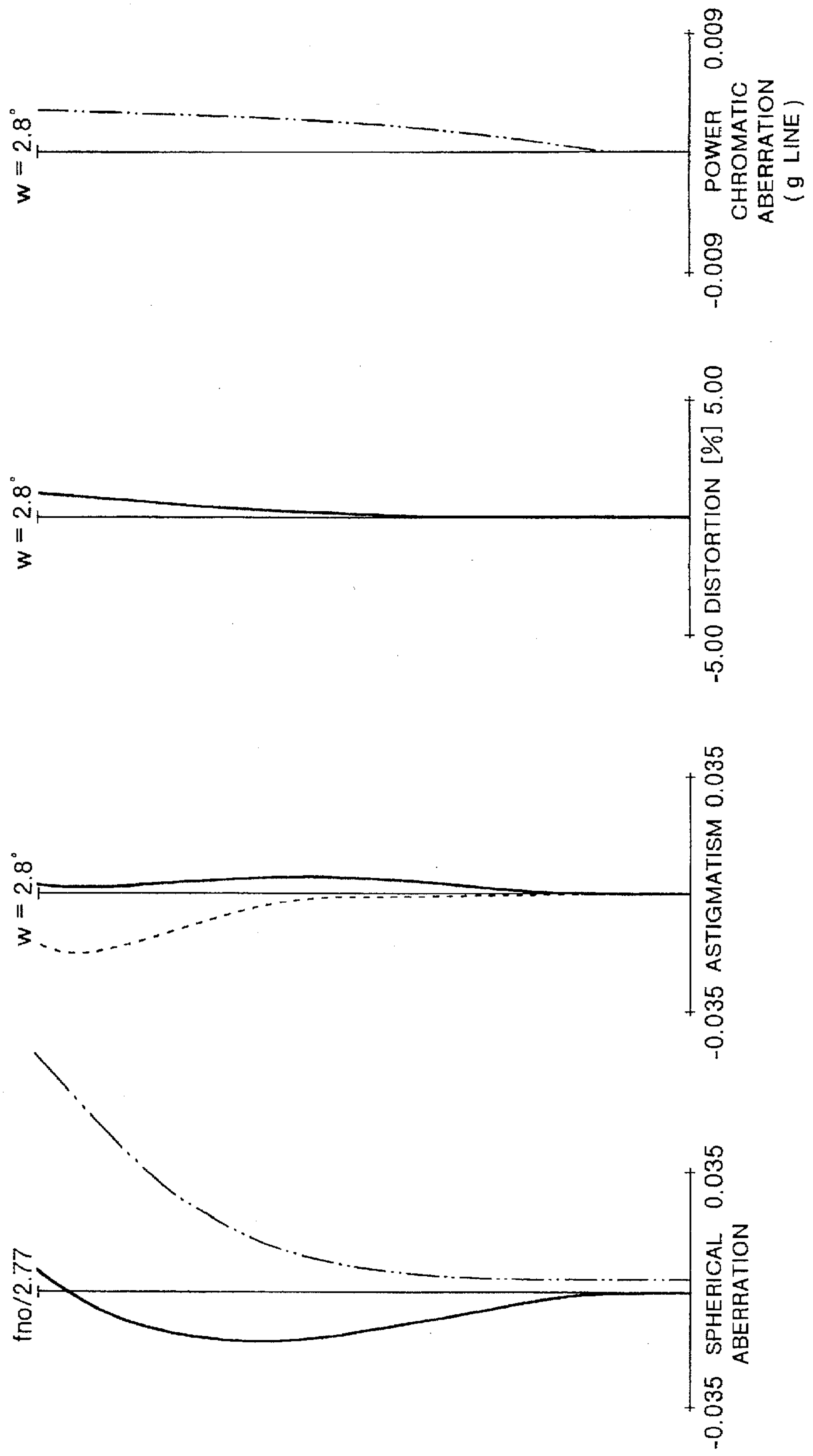
FIGS. 12A to 12D show aberrations at the telephoto end of Numerical Value Embodiment 3.

FIG. 3 is a cross-sectional view of a lens corresponding to Numerical Value Embodiment 3. The reference numeral 1 designates a first lens unit of positive refractive power, the reference numeral 2 denotes a second lens unit of negative refractive power, the reference numeral 3 designates a third lens unit of negative refractive power, the reference numeral 4 denotes a fourth lens unit of positive refractive power, and the reference numeral 5 designates a fifth lens unit of positive refractive power.

The second lens unit has the focal-length changing function, the third lens unit has the function of such a compensator that image plane fluctuation during focal-length change becomes null for a particular object distance, and the fifth lens unit has the focusing function.

By the third lens unit being made to have the function as a compensator for a particular object distance, the influence of the focus movement during zooming is reduced.

In the present embodiment, the fifth lens unit becomes fixed during focal-length change for an object distance 385 (when the focal length at the wide angle end is 1), and when the object distance is greater than this, the fifth lens unit is moved toward the image plane side during the focal-length change from the wide angle and to the telephoto end, and when the object distance is shorter than this, the fifth lens unit is moved toward the object side.

Some numerical value embodiments of the present invention are shown below.

In the numerical value embodiments, Ri represents the radius of curvature of the ith lens surface from the object side, Di represents the lens thickness or air space of the ith lens from the object side, ni and νi represent the refractive index and Abbe number, respectively, of the glass of the ith lens from the object side.

The plane parallel glass disposed most adjacent to the image plane side is an equivalent member such as a face plate or a filter.

The relations between conditional expression (1) and the various numerical values in the numerical value embodiments are shown in Table 1 below.

Also, when the direction of the optical axis from the object side toward the image plane is the X-axis and the direction perpendicular to the optical axis is the H-axis, and R is the paraxial radius of curvature, and K is the come constant, and B, C, D and E are aspherical surface coefficients, the aspherical surface is expressed by the following equation:

$$X = \frac{H^2/R}{1+\sqrt{1-(1+K)(H/R)^2}} + BH^4 + CH^6 + DH^8 + EH^{10} \quad (3)$$

Numerical Value Embodiment 1

| | | | |
|---|---|---|---|
| f = 1 to 12.66 | fno = 1:1.85 to 3.59 | 2ω = 59° to 5.1° | |
| r1 = 7.2491 | d1 = 0.3011 | n1 = 1.60311 | ν1 = 60.7 |
| r2 = 4.8359 | d2 = variable | | |
| r3 = ∞ | d3 = 0.2125 | n2 = 1.52300 | ν2 = 58.6 |
| r4 = ∞ | d4 = 0.5845 | n3 = 1.41650 | ν3 = 52.2 |
| r5 = ∞ | d5 = 0.2125 | n4 = 1.52300 | ν4 = 58.6 |
| r6 = ∞ | d6 = 0.1417 | | |
| r7 = 7.9937 | d7 = 0.2125 | n5 = 1.84666 | ν5 = 23.8 |
| r8 = 3.9434 | d8 = 0.7261 | n6 = 1.60311 | ν6 = 60.7 |
| r9 = −189.8373 | d9 = 0.0354 | | |
| r10 = 4.2844 | d10 = 0.5756 | n7 = 1.77250 | ν7 = 49.6 |
| r11 = 51.2942 | d11 = variable | | |
| r12 = 4.0459 | d12 = 0.1063 | n8 = 1.88300 | ν8 = 40.8 |
| r13 = 1.1525 | d13 = 0.4343 | | |
| r14 = −1.5931 | d14 = 0.1063 | n9 = 1.69680 | ν9 = 55.5 |
| r15 = 2.7898 | d15 = 0.1594 | | |
| r16 = 3.2370 | d16 = 0.2834 | n10 = 1.84666 | ν10 = 23.8 |
| r17 = −8.9972 | d17 = variable | | |
| r18 = (stop) | d18 = 0.21 | | |
| r19 = aspherical | d19 = 0.6730 | n11 = 1.58313 | ν11 = 59.4 |
| r20 = −2.7974 | d20 = 0.0705 | | |
| r21 = −2.2248 | d21 = 0.1594 | n12 = 1.77250 | ν12 = 49.6 |
| r22 = −3.5587 | d22 = variable | | |
| r23 = 7.6081 | d23 = 0.1240 | n13 = 1.84666 | ν13 = 23.8 |
| r24 = 2.2485 | d24 = 0.5490 | n14 = 1.51742 | ν14 = 52.4 |
| r25 = −7.2195 | d25 = 0.0354 | | |
| r26 = 4.3184 | d26 = 0.4073 | n15 = 1.51633 | ν15 = 4.2 |
| r27 = −5.8237 | d27 = 0.8855 | | |
| r28 = ∞ | d28 = 0.8855 | n16 = 1.51633 | ν16 = 64.2 |
| r29 = ∞ | | | |

| focal length | 1.00 | 4.22 | 12.66 |
|---|---|---|---|
| variable spacing | | | |
| d2 | 1.13 | 1.13 | 1.13 |
| d11 | 0.19 | 2.69 | 3.76 |
| d17 | 3.85 | 1.35 | 0.28 |
| d22 | 2.30 | 1.39 | 2.92 |

Aspherical surface
19th surface r = 4.87464 K = −1.06095 B = 6.72813D-04 C = −1.70127D-03 D = 2.73867D-03 E = −7.07303D-04
"D-Oil" represents "X10$^{-i}$".

Numerical Value Embodiment 2

| | | | |
|---|---|---|---|
| f = 1 to 12.05 | fno = 1:1.65 to 3.31 | 2ω = 60.8° to 5.6° | |
| r1 = 24.8798 | d1 = 0.3178 | n1 = 1.60311 | ν1 = 60.7 |
| r2 = 8.8590 | d2 = 0.9780 | | |
| r3 = ∞ | d3 = 0.2934 | n2 = 1.52300 | ν2 = 58.6 |
| r4 = ∞ | d4 = 0.8068 | n3 = 1.41650 | ν3 = 52.2 |
| r5 = ∞ | d5 = 0.2934 | n4 = 1.52300 | ν4 = 58.6 |
| r6 = ∞ | d6 = 0.1956 | | |
| r7 = 8.7614 | d7 = 0.22 | n5 = 1.84666 | ν5 = 23.8 |
| r8 = 4.6304 | d8 = 1.0147 | n6 = 1.60311 | ν6 = 60.7 |
| r9 = −19.2998 | d9 = 0.0489 | | |
| r10 = 4.4664 | d10 = 0.5868 | n7 = 1.71300 | ν7 = 53.8 |
| r11 = 15.6609 | d11 = variable | | |
| r12 = 14.9152 | d12 = 0.1467 | n8 = 1.77250 | ν8 = 49.6 |
| r13 = 1.1820 | d13 = 0.4841 | | |
| r14 = −3.0606 | d14 = 0.1467 | n9 = 1.69680 | ν9 = 55.5 |
| r15 = 3.0606 | d15 = 0.1834 | | |
| r16 = 2.6739 | d16 = 0.3178 | n10 = 1.84666 | ν10 = 23.8 |
| r17 = 18.3932 | d17 = variable | | |
| r18 = (stop) | d18 = 0.2689 | | |
| r19 = aspherical | d19 = 0.6112 | n11 = 1.58313 | ν11 = 59.4 |
| r20 = −11.4207 | d20 = variable | | |
| r21 = 3.2544 | d21 = 0.1467 | n12 = 1.84666 | ν12 = 23.8 |
| r22 = 1.5923 | d22 = 0.0274 | | |
| r23 = 1.7369 | d23 = 0.9046 | n13 = 1.58313 | ν13 = 59.4 |
| r24 = aspherical | d24 = 0.7335 | | |
| r25 = ∞ | d25 = 1.0611 | n14 = 1.51633 | ν14 = 64.2 |
| r26 = ∞ | | | |

| focal length | 1.00 | 3.56 | 12.05 |
|---|---|---|---|
| variable spacing | | | |
| d11 | 0.22 | 2.80 | 4.32 |
| d17 | 4.40 | 1.82 | 0.31 |
| d20 | 1.99 | 0.91 | 1.98 |

Aspherical surface
19th surface K = 3.27803 b = 3.96486D-01 c = −1.05281D-02 D = 4.73325D-04 E = −3.78976D-04
24th surface K = −4.31741 B = 1.07211D + 01 C = 1.34349D-02 D = 2.31038D-03 E = 2.03980D-03

Numerical Value Embodiment 3

| | | | |
|---|---|---|---|
| f = 1 to 11.51 | fno = 1:1.65 to 2.77 | 2ω = 58.5° to 5.6° | |
| r1 = 38.7375 | d1 = 0.2626 | n1 = 1.60311 | ν1 = 60.7 |
| r2 = 12.2336 | d2 = 0.7002 | | |
| r3 = ∞ | d3 = 0.2101 | n2 = 1.52300 | ν2 = 58.6 |
| r4 = ∞ | d4 = 0.5777 | n3 = 1.41650 | ν3 = 52.2 |
| r5 = ∞ | d5 = 0.2101 | n4 = 1.52300 | ν4 = 58.6 |
| r6 = ∞ | d6 = 0.1751 | | |
| r7 = 7.7081 | d7 = 0.2451 | n5 = 1.84666 | ν5 = 23.8 |
| r8 = 3.9667 | d8 = 1.1028 | n6 = 1.60311 | ν6 = 60.7 |
| r9 = −19.8893 | d9 = 0.0350 | | |
| r10 = 3.7864 | d10 = 0.6127 | n7 = 1.77250 | ν7 = 49.6 |
| r11 = 10.5603 | d11 = variable | | |
| r12 = 8.0018 | d12 = 0.1225 | n8 = 1.77250 | ν8 = 49.6 |
| r13 = 1.1709 | d13 = 0.5094 | | |
| r14 = −5.3150 | d14 = 0.1050 | n9 = 1.71300 | ν9 = 53.8 |
| r15 = 1.9159 | d15 = 0.1663 | | |
| r16 = 2.0181 | d16 = 0.3501 | n10 = 1.84666 | ν10 = 23.8 |
| r17 = 13.0216 | d17 = variable | | |
| r18 = −2.4853 | d18 = 0.1400 | n11 = 1.71300 | ν11 = 53.8 |
| r19 = −32.2760 | d19 = variable | | |
| r20 = (stop | d20 = 0.3501 | | |
| r21 = 10.0139 | d21 = 0.5252 | n12 = 1.51823 | ν12 = 59.0 |
| r22 = −3.4547 | d22 = 0.0263 | | |
| r23 = 4.9535 | d23 = 0.4726 | n13 = 1.60311 | ν13 = 60.7 |
| r24 = −11.3311 | d24 = 0.0263 | | |
| r25 = 3.8040 | d25 = 0.3676 | n14 = 1.51633 | ν14 = 64.2 |
| r26 = 24.4906 | d26 = 0.1838 | | |
| r27 = −5.1796 | d27 = 0.1400 | n15 = 1.80518 | ν15 = 25.4 |
| r28 = 10.8253 | d28 = variable | | |
| r29 = 3.5539 | d29 = 0.4201 | n16 = 1.51633 | ν16 = 64.2 |
| r30 = −10.1088 | d30 = 0.0263 | | |
| r31 = 1.8311 | d31 = 0.1751 | n17 = 1.84666 | ν17 = 23.8 |
| r32 = 1.4193 | d32 = 0.1663 | | |
| r33 = 2.5917 | d33 = 0.3676 | n18 = 1.48749 | ν18 = 70.2 |
| r34 = 6.8372 | d34 = 0.8753 | | |

-continued

| Numerical Value Embodiment 3 | | | |
|---|---|---|---|
| r35 = ∞ | d35 = 0.8753 | n19 = 1.51633 | ν19 = 64.2 |
| r36 = ∞ | | | |

| focal length variable spacing | 1.00 | 4.05 | 11.51 |
|---|---|---|---|
| d11 | 0.16 | 2.54 | 3.33 |
| d17 | 3.00 | 0.48 | 0.70 |
| d19 | 1.17 | 1.31 | 0.29 |
| d28 | 1.14 | 1.14 | 1.14 |

A distance to an object is 385 (constant).

TABLE 1

| Numerical value Embodiment | 1 | 2 | 3 |
|---|---|---|---|
| $\|f1a/f1\|$ | 4.692 | 5.645 | 3.780 |

What is claimed is:

1. A zooming optical system comprising in order from an object side:

a front lens unit having a negative refractive power;

a variable angle prism;

a rear lens unit having a positive refractive power, wherein a positive refractive power is provided in a combined focal length of said front lens unit and said rear lens unit; and a plurality of lens units, said zooming optical system satisfying the following conditional expression:

$$3.0<|f1a/f1|<7.0,$$

where f1 is the combined focal length of said front lens unit and said rear lens unit, and f1a is a focal length of said front lens unit.

2. A zooming optical system according to claim 1, wherein said front lens unit and said rear lens unit are stationary.

3. A zooming optical system according to claim 1, wherein said plurality of lens units are moved for a zooming operation.

4. A zooming optical system according to claim 1, wherein said plurality of lens units have, in order from an object side, a second lens unit having a negative refractive power, a third lens unit having a positive refractive power and a fourth lens unit having a positive refractive power, and wherein a spacing between adjacent lens units of said plurality of lens units is changed to execute a zooming operation.

5. A zooming optical system according to claim 1, wherein said plurality of lens units have, in order from an object side, a second lens unit having a negative refractive power, a third lens unit having a negative refractive power, a fourth lens unit having a positive refractive power and a fifth lens unit having a positive refractive power, and wherein a spacing between adjacent lens units of said plurality of lens units is changed to execute a zooming operation.

6. A zooming optical system according to claim 1, wherein said front lens unit is a single lens.

7. A zooming optical system comprising in order from an object side:

a first lens unit including a front lens unit having a negative refractive power, a variable angle prism, and a rear lens unit having a positive refractive power, wherein a positive refractive power is provided in a combined focal length of said front lens unit and said rear lens unit;

a second lens unit having a negative refractive power, wherein zooming is performed by moving said second lens unit; and a third lens unit having a positive refractive power;

wherein said zooming optical system satisfies the following conditional expression:

$$3.0<|f1a/f1|<7.0$$

wherein f1 is the combined focal length of said front lens unit and said rear lens unit, and f1*a* is a focal length of said front lens unit.

8. A zooming optical system according to claim 7, wherein said front lens unit and said rear lens unit are stationary.

9. A zooming optical system according to claim 7, wherein said front lens unit is a single lens.

10. A zooming optical system according to claim 7, wherein said third lens unit is stationary while zooming is being performed.

11. A zooming optical system according to claim 7, further comprising a fourth lens unit having a positive refractive power, wherein said fourth lens unit is moved while zooming is being performed.

* * * * *

UNITED STATES PATENT AND TRADEMARK OFFICE
CERTIFICATE OF CORRECTION

PATENT NO. : 5,677,792 Page 1 of 2

DATED : October 14, 1997

INVENTOR(S) : Hiroyuki HAMANO

It is certified that error appears in the above-identified patent and that said Letters Patent is hereby corrected as shown below:

COLUMN 1

Line 20, "system" should read --systems--; and
Line 30, "Kensor," should read --sensor,--.

COLUMN 3

Line 45, "$\beta$" should read --$\tilde{\beta}$--.

COLUMN 4

Line 10, "will" should read --will go--; and
Line 67, "angle and" should read --angle end--.

COLUMN 5

Line 20, "come" should read --cone--;
Line 52, "$\nu$15=4.2" should read --$\nu$15=64.2--; and
Line 64, "D-0il" should read --D-0i--.

UNITED STATES PATENT AND TRADEMARK OFFICE

CERTIFICATE OF CORRECTION

PATENT NO. : 5,677,792

DATED : October 14, 1997

INVENTOR(S) : Hiroyuki HAMANO

It is certified that error appears in the above-identified patent and that said Letters Patent is hereby corrected as shown below:

COLUMN 6

Line 9, "d7=0.22" should read --d7=0.2200--;
Line 31, "b=" should read --B=--, and "c=" should read --C=--; and
Line 54, "(stop" should read --(stop)--.

Signed and Sealed this

Eighth Day of September, 1998

Attest:

BRUCE LEHMAN

Attesting Officer

Commissioner of Patents and Trademarks